United States Patent [19]
Hirano

[11] Patent Number: 5,986,350
[45] Date of Patent: Nov. 16, 1999

[54] POWER SUPPLY SYSTEM FOR VEHICLE

[75] Inventor: Seiji Hirano, Hiroshima, Japan

[73] Assignee: Mazda Motor Corporation, Hiroshima, Japan

[21] Appl. No.: 08/926,473

[22] Filed: Sep. 10, 1997

Related U.S. Application Data

[63] Continuation of application No. 08/511,830, Aug. 7, 1995, abandoned.

[30]       Foreign Application Priority Data

Aug. 5, 1994   [JP]   Japan ................................... 6-184988

[51] Int. Cl.$^6$ ..................................................... H04J 3/14
[52] U.S. Cl. .......................... 307/9.1; 307/10.1; 370/241; 370/453; 340/825.06
[58] Field of Search ..................................... 307/9.1–10.8, 307/38, 39, 40; 361/254, 258, 264, 265, 268, 82, 77, 84, 87; 439/621, 622; 340/825, 825.06, 825.05; 701/1, 2, 36, 49; 370/85.1, 85.9, 241, 453; 320/37

[56]              References Cited

U.S. PATENT DOCUMENTS

| 4,305,004 | 12/1981 | Tanaka et al. .......................... 307/10.1 |
| 4,685,052 | 8/1987 | Sanders ....................................... 371/64 |
| 5,145,414 | 9/1992 | Oikawa .................................... 439/621 |
| 5,172,045 | 12/1992 | Takeyasu .................................. 320/37 |
| 5,483,517 | 1/1996 | Kurata et al. .......................... 307/10.1 |
| 5,539,610 | 7/1996 | Williams ................................. 307/10.7 |

FOREIGN PATENT DOCUMENTS

4-283140   7/1992   Japan .

Primary Examiner—Albert W. Paladini

[57]              ABSTRACT

A power supply system having a primary control power line for supplying electric power to control systems indispensable to driving the vehicle from an electric power source. The power supply system is provided with an ignition switch cooperating with an ignition switch system so as to connect the electric power source to the indispensable control systems when an ignition key is turned to the ignition position and to disconnect the electric power source when the ignition key is turned to the off position. The power supply system also includes a subordinate control power line including a removable fuse for supplying electric power from the electric power source through the ignition switch system to at least those control systems indispensable to driving the vehicle.

22 Claims, 5 Drawing Sheets

POWER SUPPLY SYSTEM FOR VEHICLE

This application is a continuation of application Ser. No. 08/511,830, filed Aug. 7, 1995, now abandoned.

BACKGROUND OF THE INVENTION

1. Field of the Invention

The present invention relates to a power supply system for a vehicle, and, more particularly, to a power supply system for a vehicle which can be disabled from supplying electric power to at least those control systems dispensable to driving until the ignition key is turned to the ignition position.

2. Description of the Related Art

Typically, a power supply apparatus for a vehicle which includes a single master station and a plurality of remote stations grouped according to functions of electric equipments, which are connected to multiplex communication lines, is provided with a mode control switch for changing the remote stations between a sleep mode and an alive mode. The mode control switch places the remote stations in the sleep mode when all switches including an ignition switch and switches of the electric equipments are off so as to reduce a dark current. Such a power supply apparatus is known from, for instance, Japanese Unexamined Patent Publication No. 4-283140.

The prior art power supply apparatus leaves the remote stations still connected to a power source in the sleep mode, yielding a fall in dark current only to a certain limited extent and providing consumption of electric power even in the sleep mode. If the vehicle is left with the power supply apparatus in the sleep mode for a long time, for instance, before shipping, the battery possibly runs down.

SUMMARY OF THE INVENTION

It is an object of the present invention to provide a power supply system which prevents a battery from running down before shipping and delivery or during storing.

It is another object of the present invention to provide a power supply system which enables a vehicle to be driven whenever desired even after or during a long storage period.

The above objects of the present invention are achieved by providing a power supply system for supplying electric power from an electric power source to a plurality of control systems for governing control of driving systems and components of a vehicle as electric loads. The power supply system includes a primary power line having an ignition switch which supplies electric power to the control systems indispensable to driving the vehicle from the electric power source and a subordinate power line for supplying electric power to at least control systems indispensable to driving the vehicle from the electric power source through an ignition switch system having at least an ignition position and an off position. The primary power line is provided with an ignition switch which cooperates with the ignition switch system to turn on so as to connect the power supply to the indispensable control systems when an ignition key is turned to the ignition position and to turn off so as to disconnect the power supply from the indispensable control systems when said ignition key is turned to the off position. On the other hand, the subordinate power line includes a fuse disposed therein and removable therefrom.

Each control system includes a data communication circuit for data communication with a multiplex bus line connected to the control system to which control power is supplied through a control power input and an interface circuit for transferring signals between the data communication circuit and the driving system and components related to the control system to which load power is supplied through a load power input thereof.

With the power supply system, if the removable fuse is taken away from the subordinate power line, the power supply system is disabled to supply electric power to at least the control systems dispensable to driving the vehicle until the ignition key is turned to the ignition position, the battery is prevented from running down leaving the vehicle as it is during storing and/or shipping. On the other hand, even when the fuse has been taken away from the power supply apparatus, the vehicle can be driven whenever the ignition key is turned to the ignition position even during storing or shipping. Furthermore, the power supply system is revived and put ready for driving only by placing a fuse in the subordinate power line.

In the power supply system, the ignition switch in the primary power line may be directly cooperative with the ignition switch system. Alternatively, the ignition switch may be operated by means of a switching circuit comprising a switch cooperating directly with the ignition switch system and an electromagnetic coil linked with the ignition switch. The ignition switch is turned on by the electromagnetic coil energized when the ignition key is turned to the ignition position to turn on the switch of the switching circuit.

BRIEF DESCRIPTION OF THE DRAWINGS

The above and other objects and features of the present invention will be clearly understood from the following description with respect to a preferred embodiment thereof when considered in conjunction with the accompanying drawings, wherein same reference signs have been used to denote the same or similar elements or parts, and in which.

DETAILED DESCRIPTION OF THE PREFERRED EMBODIMENTS

A power supply system includes an ignition switch system to which electricity is supplied from a battery and which utilizes a key to operate it. The ignition switch system connects or disconnects the flow of electricity across terminals that supply electricity to various units or systems on the vehicle according to ignition key positions such as an OFF position, an accessory (ACC) position, an ignition (ON) position and a start position. Because power supply systems of this kind are well known, the following description will be given to a power supply system in connection with ignition only for simplicity and directed in particular to elements forming part of, or cooperating directly with, a system in accordance with the present invention. It is to be understood that elements not specifically shown or described can take various forms well known to those skilled in the vehicle power supply art.

Figure 1:
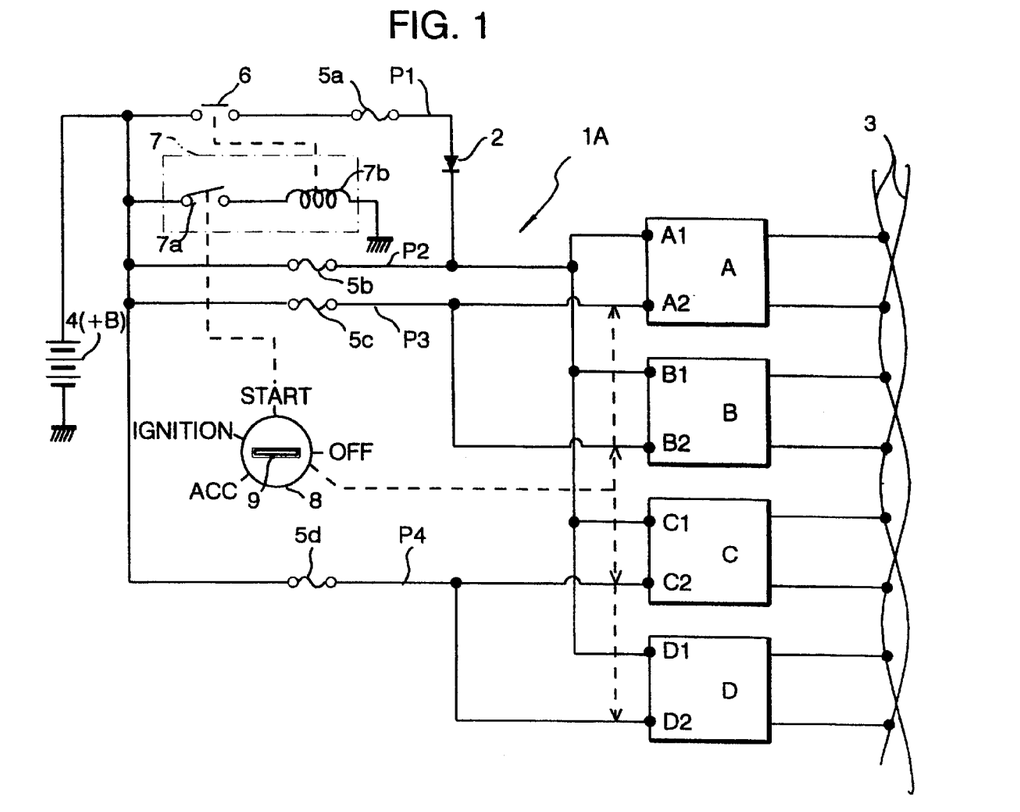
FIG. 1 is a circuit diagram showing a power supply system in accordance with a preferred embodiment of the present invention.

Referring now to the drawings in detail, and in particular, to FIG. 1 which shows a power supply system 1A for a vehicle in accordance with a preferred embodiment of the present invention having, for instance, four multiplex communication nodes A–D. The multiplex communication node A governs control of electric systems and elements necessary to actuate, for instance, an engine and an automatic transmission. The multiplex communication node B governs control of electric systems or components, such as an air conditioning system, an audio system and an auto-cruising system. The multiplex communication node C governs lighting of various lamps including hazard lamps, head lamps and indicator lamps on an instrument panel. The multiplex communication node D governs control of operation of automatic door lock and power window systems.

These multiplex communication nodes A–D are connected to multiplex bus lines 3 so as to transfer control signals. Each of the multiplex communication nodes A–D, details of which will be described in detail later, is supplied at control power inputs A1–D1 with control power for data communication and at load power inputs A2–D2 with load power, which may contain noises, for operating electric systems and elements as electric loads including motors, electromagnetic coils, lamps and the like according to signals provided by data communication systems of the respective multiplex communication nodes A–D.

Control power inputs A1–D1 of the respective multiplex communication nodes A–D are connected to a power source or battery unit 4 having a voltage of, for instance, 12 V through a first or primary control power line P1 including a fuse 5a and an ignition switch 6 disposed therein. In order for the ignition switch 6 to turn on and off, the power supply system 1A includes a switching circuit 7 comprising a switch 7a and an electromagnetic coil 7b. The switch 7a cooperates with an ignition switch system 8. When the switch 7a is turned on, the electromagnetic coil 7b is energized, forcing the ignition switch 6 to turn on. The switch 7a is linked with an ignition switch system 8 only schematically shown. Together, the control power inputs A1–D1 of the respective multiplex communication nodes A–D are connected to the batteries 4 through a second or subordinate control power line P2 including a removable fuse 5b which is removable therefrom. The power supply system 1A is structured so as to provide an easy access to the fuse 5b for easy removal and installation of the fuse 5b. The primary control power line P1 is provided with a diode 2 after the fuse 5a remote from the batteries 4 so as to prevent a counter flow of electricity from the subordinate control power line P2.

Load power inputs A2 and B2 of the multiplex communication nodes A and B are connected to the batteries 4 through a load power line P3 including a fuse 5c therein. Similarly, load power inputs C2 and D2 of the multiplex communication nodes C and D are connected to the batteries 4 through a load power line P4 including a fuse 5d therein. These load power lines P3 and P4 are connected to the multiplex communication nodes A–D through the ignition switch system or assembly 8 such as comprising a bezel cylinder and a key. The ignition switch system 8 has terminals at various key positions such as an OFF position, accessory positions an ignition or ON position and a start and prove out position. Such an ignition switch system 8 is well known in the automobile art, and any type well known to those skilled in the art may be utilized.

The switch 7a of the switching circuit 7 is linked with the ignition switch system 8 so that, when the ignition key is turned to the ignition position, the switch 7a is cooperatively turned on so as to energize the electromagnetic coil 7b, thereby forcing the ignition switch 6 to turn on. In this instance, the ignition switch 6 may be directly linked to the ignition switch system 8 so as to turn on when the ignition key is turned to the ignition position.

Figure 2:
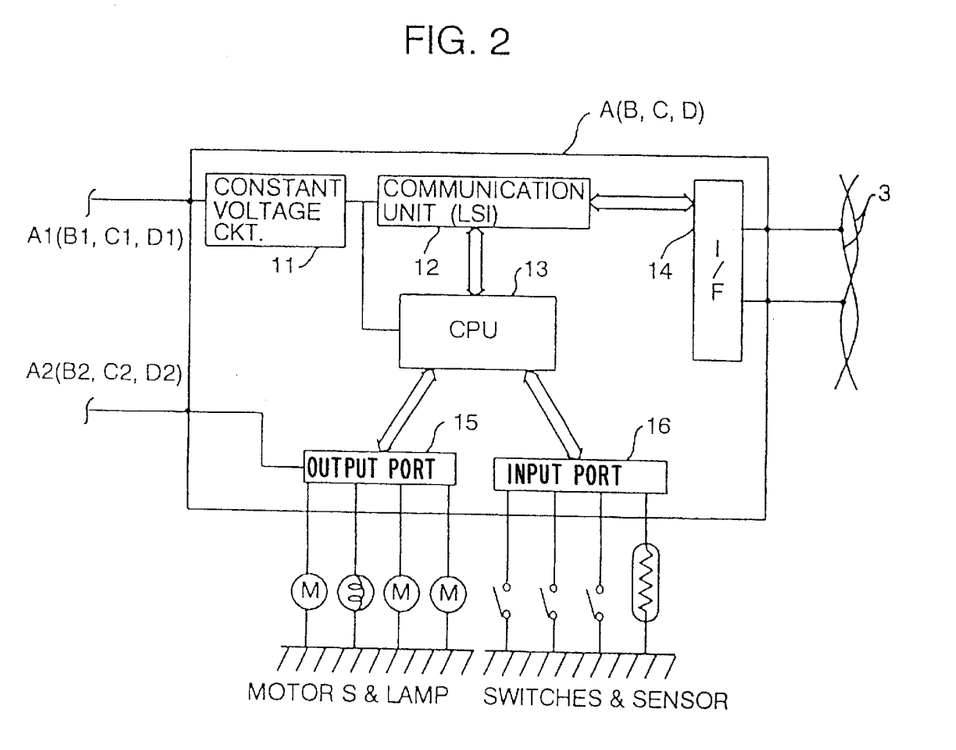
FIG. 2 is a block diagram showing a circuit structure of a multiplex communication node.

FIG. 2 shows a circuit structure of each multiplex communication node A–D in detail. The node circuit includes a communication unit 12 comprising a large scale integrated circuit (LSI), a central processing unit 13 and an interface circuit 14 for transferring data between the communication unit 12 and the multiplex bus line 3. These communication unit 12, central processing unit 13 and interface circuit 14 are supplied with control power after, if necessary, voltage transformation from 12 V to, for instance, 5 V. The node circuit further includes interface circuits such as an output port 15 and an input port 16 to which load power is supplied through the load power inputs A2–D2. The input port 16 transfers signals from various sensors and switches relating to the electric load systems and components to the central data processing unit 13. When receiving control signals, the central data processing unit 13 sends control signals to various electric loads such as motors and lamps through the output port 15.

With the power supply system 1A shown in FIGS. 1 and 2, the multiplex communication nodes A–D are always supplied at the load power inputs A2–D2 with load power through the load power lines P3 and P4. However, the electric load systems and components controlled by the multiplex communication nodes A–D are not activated until they are supplied at the control power inputs A1–D1 with control power through at least one of the control power lines P1 and P2. During ordinary use of the car, since the subordinate control power line P2 is always alive, the electric load systems and components controlled by the multiplex communication nodes A–D are activated according to selected positions of the ignition switch system. However, if the vehicle is left with the subordinate control power line P2 kept alive for a long time, for instance, during storing and/or shipping, the battery unit 4 possibly runs down due to a continuous flow of dark current. In order to prevent the battery unit 4 from running down, the fuse 5b is taken away from the subordinate control power line P2 of the power supply system 1A before shipping or storing. The power supply system 1A with the fuse 5b taken away from the subordinate control power line P2 does not provide power supply to the multiplex communication nodes A–D as long as the switch 7a is kept turned off during storing and shipping and, consequently, there is no power consumption of the battery unit 4 though the electric load systems and components.

On the other hand, even when the fuse 5b has been taken away from the subordinate control power line P2, the power supply system 1A supplies control power to the multiplex communication nodes A–D whenever the switch 7a turns on. Accordingly, even during storing or shipping, the power supply system 1A supplies control power to the multiplex communication nodes A–D whenever the ignition key is turned to the ignition position, enabling the vehicle to be driven even though the subordinate control power line P2 is dead. Before the vehicle is delivered to a customer, the fuse 5a is returned into the subordinate control power line P2, placing the power supply system 1A in an ordinary condition for driving the vehicle.

Figure 3:
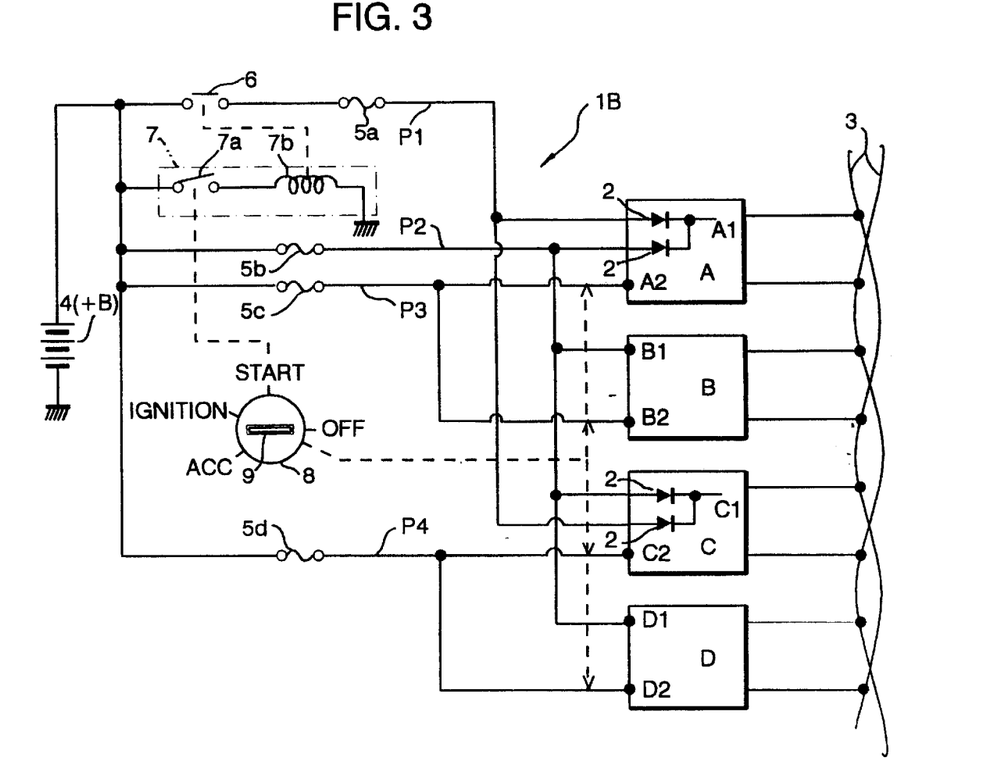
FIG. 3 is a circuit diagram showing a power supply system in accordance with another preferred embodiment of the present invention.

FIG. 3 shows a power supply system 1B for a vehicle in accordance with another preferred embodiment of the present invention having four multiplex communication nodes A and D. In this embodiment, the multiplex communication nodes A and C control electric systems and components indispensable to driving the vehicle before purchase of the vehicle, i.e., during storing and/or shipping the vehicle; however, the multiplex communication nodes B and D control electric systems and components which are not always indispensable to driving the vehicle during storing and/or shipping the vehicle but necessary after purchase of the vehicle.

Control power inputs A1 and C1 of the multiplex communication nodes A and C are connected to a +B power source or battery unit 4 a primary control power line P1 including a fuse 5a and an ignition switch 6. A switching circuit 7, comprising a switch 7a and an electromagnetic coil 7b, cooperates with an ignition switch system 8. When an ignition key is turned to the ignition position, the switch 7a is turned on, energizing the electromagnetic coil 7b so as to force the ignition switch 6 to turn on. The control power inputs A1–D1 of the multiplex communication nodes A–C are connected to the battery unit 4 through a subordinate control power line P2 including a removable fuse 5b in parallel with the fuse 5a. Load power inputs A2 and B2 of the multiplex communication nodes A and B are connected to the battery unit 4 through a load power line P3 including a fuse 5c therein. Similarly, load power inputs C2 and D2 of the multiplex communication nodes C and D are connected to the battery unit 4 through a load power line P4 including a fuse 5d therein. The multiplex communication nodes A and C, to which control power is supplied through both control power lines P1 and P2, are provided with constant voltage circuits 11 as shown in FIG. 2. These control power lines P1 and P2, leading to the constant voltage circuits 11 of the multiplex communication nodes A and C, are provided with diodes 2, respectively, so as to prevent a counter flow of electricity between the control power lines P1 and P2.

When the ignition key is turned to the ignition position, the switch 7a is turned on, forcing the ignition switch 6 to turn on so as to make the primary control power line P1 alive. Control power is supplied to the control power inputs A1 and C1 of the multiplex communication nodes A and C only through the primary control power line P1 if the fuse 5b has been taken away from the subordinate control power line P2. While the load power lines P3 and P4 are always alive, nevertheless, the load power inputs A2–D2 of the multiplex communication nodes A–D do not consume electric power until the control power inputs A1–D1 of the multiplex communication nodes A–D are supplied with electric power. If the fuse 5b is taken away from the power supply system 1B before shipping or during storing the vehicle, load power is not consumed through the load power lines P3 and P4 as long as the ignition key 9 is removed from the ignition switch system 8, preventing the batteries 4 from running down during storing or shipping. On the other hand, even if the fuse 5b is taken away from the power supply system 1B, control power is supplied to the multiplex communication nodes A and C only whenever the ignition key 9 is turned to the ignition position, enabling the vehicle to be driven with less electric power consumption even during storing or shipping.

Figure 4:
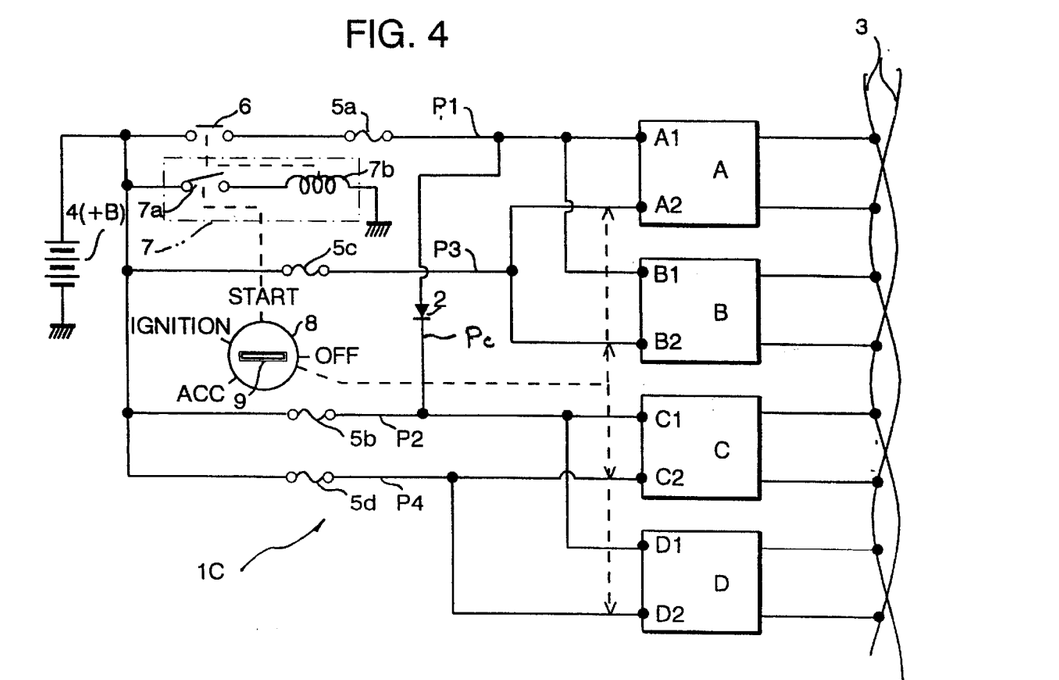
FIG. 4 is a circuit diagram showing a power supply system in accordance with still another preferred embodiment of the present invention.

FIG. 4 shows a power supply system 1C for a vehicle in accordance with still another preferred embodiment of the present invention having four multiplex communication nodes A–D. Control power inputs A1–D1 of the multiplex communication nodes A–D are connected to a +B power source or batteries 4 through a primary control power line P1 including a fuse 5a and an ignition switch 6 when the ignition key 9 is turned to the ignition position. Together, control power inputs C1 and D1 of the multiplex communication nodes C and D are always connected to the batteries 4 through a subordinate control power line P2 including a removable fuse 5b in parallel with the fuse 5a. These control power lines P1 and P2 are connected to each other by a line Pc including a diode 2. Load power inputs A2 and B2 of the multiplex communication nodes A and B are connected to the battery 4 through a load power line P3 including a fuse 5c therein. Similarly, load power inputs C2 and D2 of the multiplex communication nodes C and D are connected to the battery unit 4 through a load power line P4 including a fuse 5d therein. When the ignition key 9 is turned to the ignition position, the primary control power line P1 is made alive, so that control power is supplied to the control power inputs A1–D1 of the multiplex communication nodes A–D through the primary control power line P1. Together, control power is also supplied to control power inputs C1 and D1 of the multiplex communication nodes C and D through the subordinate control power line P2 as long as the fuse 5b is in the subordinate control power line P2. While the load power lines P3 and P4 are always alive, nevertheless, the load power inputs A2 and B2 of the multiplex communication nodes A and B do not consume electric power until the switch 7a, and hence the ignition switch 6 in the primary control power line P1, is turned on.

If the fuse 5b is taken away from the power supply system 1C before shipping or during storing the vehicle, load power is not consumed through the load power lines P3 and P4 as long as the ignition key 9 is removed from the ignition switch system 8, preventing the batteries 4 from running down during storing or shipping. On the other hand, even if the fuse 5b is taken away from the power supply system 1C, control power is supplied to the multiplex communication nodes A–D whenever the ignition key 9 is turned to the ignition position, enabling the vehicle to be driven even during storing or shipping.

Figure 5:
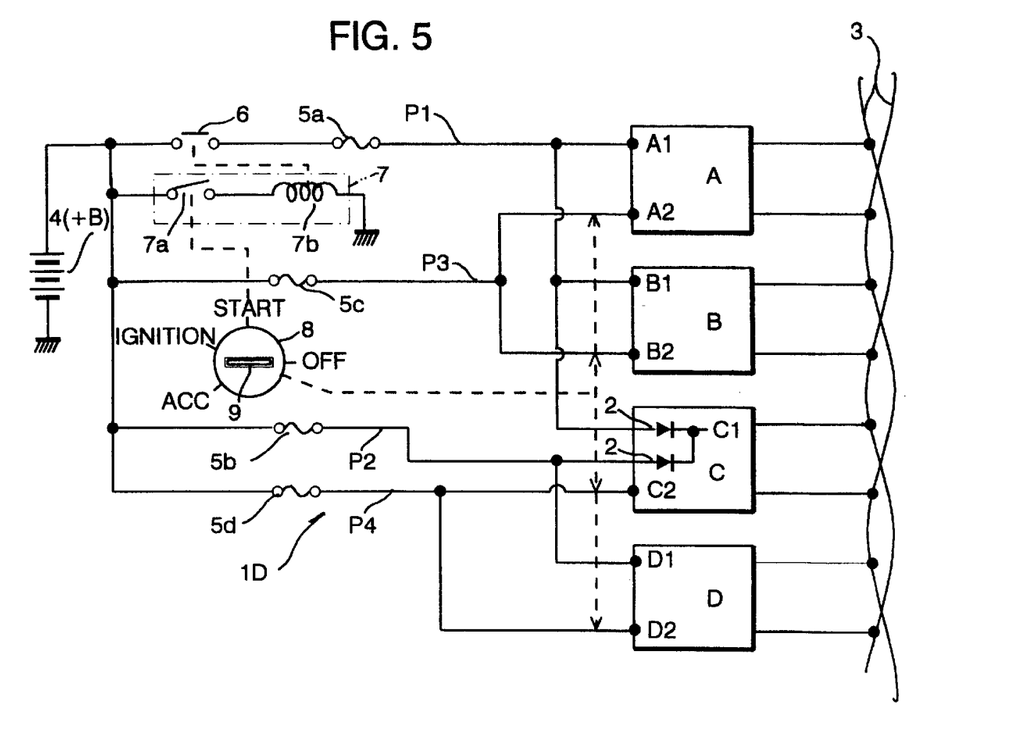
FIG. 5 is a circuit diagram showing a power supply system in accordance with a further preferred embodiment of the present invention.

FIG. 5 shows a power supply system 1D for a vehicle in accordance with a further preferred embodiment of the present invention having four multiplex communication nodes A–D in which the multiplex communication nodes A, B and C control electric systems and components indispensable to driving the vehicle before purchase of the vehicle, i.e., during storing and/or shipping the vehicle and, however, the multiplex communication node D controls electric systems and components which are not always indispensable to driving the vehicle during storing and/or shipping the vehicle but necessary after purchase of the vehicle.

Control power inputs A1, B1 and C1 of the multiplex communication nodes A, B and C are connected to a +B power input of battery unit 4 through a primary control power line P1 including a fuse 5a and an ignition switch 6. A switching circuit 7, comprising a switch 7a and an electromagnetic coil 7b, cooperates with an ignition switch system 8. When an ignition key 9 is turned to the ignition position, the switch 7a is turned on, energizing the electromagnetic coil 7b so as to force the ignition switch 6 to turn on. Control power inputs C1 and D1 of the multiplex communication nodes C and D are further connected to the battery unit 4 through a subordinate control power line P2 including a removable fuse 5b. These control power lines P1 and P2, leading to the control power input C1, are provided with diodes 2, respectively, so as to prevent a counter flow of electric current between the control power lines P1 and P2.

Load power inputs A2 and B2 of the multiplex communication nodes A and B are connected to the battery 4 through a load power line P3 including a fuse 5c therein. Similarly, load power inputs C2 and D2 of the multiplex communication nodes C and D are connected to the battery 4 through a load power line P4 including a fuse 5d therein. The multiplex communication node C, which is supplied with control power through both control power lines P1 and P2, is provided with a constant voltage circuit 11 as shown in FIG. 2. These control power lines P1 and P2, leading only to the control voltage circuit 11 of the multiplex communication node C, are provided with diodes 2, respectively.

With the power supply system 1D, when the ignition key 9 is turned to the ignition position, the switch 7a is turned on, so as, on one hand, to supply control power to the control power inputs A1, B1 and C1 of the multiplex communication nodes A, B and C through only the primary control power line P1 if the fuse 5b has been taken away from the subordinate control power line P2 and, on the other hand, to supply control power to the control power inputs A1, B1 and C1 of the multiplex communication nodes A, B and C through the primary and subordinate control power lines P1 and P2 if the fuse 5b is in the subordinate control power line P2. However, the multiplex communication node D is always supplied with electric power through the load power line P4 only in spite of the operation of the ignition key 9.

While the load power lines P3 and P4 are always alive, the load power inputs A2–C2 of the multiplex communication nodes A–C do not consume electric power until the switch 7a, and hence the ignition switch 6 in the subordinate control power line P1, is turned on.

If the fuse 5b is taken away from the power supply system 1D before shipping or during storing the vehicle, load power is not consumed through the load power lines P3 and P4 as long as the ignition key 9 is removed from the ignition switch system 8, preventing the batteries 4 from running down during storing or shipping. On the other hand, even if the fuse 5b is taken away from the power supply system 1D, control power is supplied to the multiplex communication nodes A–C which are indispensable to control electric systems and components necessary to drive the vehicle, whenever the ignition key 9 is turned to the ignition position, enabling the vehicle to be driven even during storing or shipping.

According to the power supply system of the present invention, the power supply system 1A–1D is disabled by taking the fuse 5b away from the subordinate control power line P2 to supply electric power to at least the multiplex communication nodes indispensable to driving the vehicle until the ignition switch 6 is turned on, the battery unit 4 is prevented from running down during storing and/or shipping. On the other hand, the vehicle with the fuse 5b left taken away from the power supply system 1A–1D can be driven whenever the ignition switch 6 is turned on by turning the ignition key 9 to the ignition position even during storing or shipping. Furthermore, the power supply system 1A–1D is revived and put ready for driving only by placing a fuse in the subordinate control electric power line P2.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A power supply system for supplying electric power from an electric power source to a plurality of control systems having control power inputs and load power inputs for controlling driving systems and components of a vehicle as electric loads, said power supply system comprising:

an ignition switch system to activate said control systems;

a primary control power line including an ignition switch having at least an ignition position and an OFF position and cooperative with said ignition switch system to supply electric power to control power inputs of only a first group of said control systems from said electric power source, said primary control power line connecting power supply to said control power input of each said control system of said first group when said ignition switch is in said ignition position and disconnecting power supply from each said control system of said first group when said ignition switch is in said OFF position;

a subordinate control power line including a fuse disposed therein and removable therefrom to supply electric power from said electric power source to said control power inputs of each of said first group of said control systems and each of a second group of said control systems; and a load power line to supply electric power to a load power input of each said control system of said first group and said second group.

2. A power supply system as recited in claim 1, wherein said first group of control systems includes systems and components indispensable to driving the vehicle.

3. A power supply system as recited in claim 2, wherein said first group of said control systems includes at least one of an engine and an automatic transmission.

4. A power supply system as recited in claim 2, wherein said first group of said control systems includes systems and components necessary to driving the vehicle.

5. A power supply system as recited in claim 4, wherein said second group of said control systems includes systems and components unnecessary to driving the vehicle.

6. A power supply system as recited in claim 5, wherein said first group of said control systems includes at least one of hazard lamps and head lamps.

7. A power supply system as recited in claim 5, wherein said first group of said control systems includes at least one of a steering system and driving instruments.

8. A power supply system as recited in claim 2, wherein said second group of said control systems includes systems and components dispensable to driving the vehicle.

9. A power supply system as recited in claim 8, wherein said first group of said control systems includes at least one of an engine and an automatic transmission.

10. A power supply system for supplying electric power from an electric power source to a plurality of control systems having control power inputs and load power inputs for controlling driving systems and components of a vehicle as electric loads, said power supply system comprising:

an ignition switch system to activate said control systems;

a primary control power line including an ignition switch having at least an ignition position and an OFF position and cooperative with said ignition switch system to supply electric power from said electric power source to communication nodes having control power inputs of a first group and a second group of said control systems only from said electric power source, said primary control power line connecting power supply to said communication node at said control power input of each said control system of said first and second groups when said ignition switch is in said ignition position and disconnecting power supply from said communication node of each said control system of said first and second groups when said ignition switch is in said OFF position;

a subordinate control power line including a fuse disposed therein and removable therefrom to supply electric power from said electric power source to said communication node at said control power input of each said control system of said first group and a third group only from said electric power source; and a load power line to supply electric power to a load power input of said communication node of each of said control systems of said first, second and third groups.

11. A power supply system as recited in claim 10, wherein said first group of said control systems includes systems and components necessary to driving the vehicle.

12. A power supply system as recited in claim 11, wherein said third group of said control systems includes systems and components unnecessary to driving the vehicle.

13. A power supply system as recited in claim 12, wherein said first group of said control systems includes at least one of hazard lamps and head lamps.

14. A power supply system as recited in claim 12, wherein said first group of said control systems includes at least one of a steering system and driving instruments.

15. A power supply system as recited in claim 10, wherein said second group of said control systems includes systems and components indispensable to driving the vehicle.

16. A power supply system as recited in claim 10, wherein said third group of said control systems includes systems and components indispensable to driving the vehicle.

17. A power supply system as recited in claim 16, wherein said first group of said control systems includes at least one of an engine and an automatic transmission.

18. A power supply system for supplying electric power from an electric power source to a plurality of control systems having control power inputs and load power inputs for controlling driving systems and components of a vehicle as electric loads, said power supply system comprising:

an ignition switch system to activate said control systems;

a primary control power line including an ignition switch having at least an ignition position and an OFF position and cooperative with said ignition switch system to supply electric power to communication nodes having control power inputs of first and second groups of said control systems from said electric power source, said primary control power line connecting power supply to said communication node at said control power input of each of said control systems of said first and second groups when said ignition switch is in said ignition position and disconnecting power supply from said communication node of each of said control systems of said first and second groups when said ignition switch is in said OFF position;

a subordinate control power line including a fuse disposed therein and removable therefrom to supply electric power to said communication node at said control power input of each of said second group of said control systems from said electric power source; and a load power line to supply electric power to a load power input of said communication node of each of said first and second groups of control systems.

19. A power supply system as recited in claim 18, wherein said first group of said control systems includes at least one of an engine and an automatic transmission.

20. A power supply system as recited in claim 18, wherein said second group of said control systems includes at least one of hazard lamps and head lamps.

21. A power supply system as recited in claim 18, wherein said second group of said control systems includes at least one of a steering system and driving instruments.

22. A power supply system as recited in claim 18, wherein said first group of said control systems includes at least one of an air conditioning system and an audio system.

* * * * *